US012636980B2

(12) United States Patent
Li et al.

(10) Patent No.: US 12,636,980 B2
(45) Date of Patent: May 26, 2026

(54) CHILD SAFETY SEAT

(71) Applicant: Bambino Prezioso Switzerland AG, Steinhausen (CH)

(72) Inventors: Ruyi Li, Steinhausen (CH); Xin Chen, Steinhausen (CH)

(73) Assignee: Bambino Prezioso Switzerland AG, Steinhausen (CH)

( * ) Notice: Subject to any disclaimer, the term of this patent is extended or adjusted under 35 U.S.C. 154(b) by 450 days.

(21) Appl. No.: 18/156,802

(22) Filed: Jan. 19, 2023

(65) Prior Publication Data

US 2023/0234478 A1 Jul. 27, 2023

(30) Foreign Application Priority Data

Jan. 25, 2022 (CN) .......................... 202210089424.4

(51) Int. Cl.
| *B60N 2/28* | (2006.01) |
| *B60N 2/26* | (2006.01) |
| *B62B 9/10* | (2006.01) |

(52) U.S. Cl.
CPC ........... B60N 2/265 (2013.01); B60N 2/2816 (2023.08); *B60N 2/2881* (2013.01); *B60N 2/2884* (2013.01); *B62B 9/106* (2013.01)

(58) Field of Classification Search
CPC .... B60N 2/2881; B60N 2/2884; B60N 2/882; B60N 2/265; B62B 9/106
See application file for complete search history.

(56) References Cited

U.S. PATENT DOCUMENTS

| 10,046,676 B2* | 8/2018 | Oswald | B60N 2/2851 |
| 10,632,871 B2* | 4/2020 | Schmitz | B60N 2/2851 |
| 2001/0022457 A1 | 9/2001 | Voris | |
| 2002/0163243 A1 | 11/2002 | Parenteau et al. | |
| 2004/0108758 A1 | 6/2004 | Eastman et al. | |
| 2010/0308631 A1 | 12/2010 | Biaud | |
| 2012/0326476 A1* | 12/2012 | Runk | B60N 2/2812 |
| | | | 297/250.1 |
| 2013/0088063 A1* | 4/2013 | Montes | B60N 2/882 |
| | | | 297/391 |

FOREIGN PATENT DOCUMENTS

| CN | 202448780 U | 9/2012 |
| CN | 202941765 U | 5/2013 |

(Continued)

OTHER PUBLICATIONS

The Extended European Search Report dated Jun. 13, 2023 from the related EP Patent Application No. 23153191.4.

(Continued)

*Primary Examiner* — Syed A Islam
(74) *Attorney, Agent, or Firm* — Fay Kaplun & Marcin, LLP

(57) ABSTRACT

A child safety seat includes a backrest; a headrest formed with a shoulder belt hole; and a shoulder belt extending through the shoulder belt holes, wherein a back surface of the headrest has a first connector and a front surface of the backrest has a second connector, and the first connector is attached to the second connector in a height adjustable manner. The child safety seat may synchronously adjust the height of the shoulder belt while adjusting the height of the headrest.

11 Claims, 14 Drawing Sheets

(56)        References Cited

FOREIGN PATENT DOCUMENTS

| CN | 107685661 | A  | 2/2018  |
|----|-----------|----|---------|
| CN | 207190869 | U  | 4/2018  |
| CN | 207902217 | U  | 9/2018  |
| CN | 109774550 | A  | 5/2019  |
| CN | 209404196 | U  | 9/2019  |
| EP | 2 484 549 | A1 | 8/2012  |
| KR | 20150003504 | U | 9/2015 |
| TW | M540060   |    | 4/2017  |
| TW | M584755   | U  | 10/2019 |

OTHER PUBLICATIONS

TW Office Action from the related TW Patent Application No. 112102750, Aug. 9, 2024, 10 sheets.
TW Office Action from the related TW Patent Application No. 112102750, Sep. 27, 2023, 7 sheets.
CN Office Action along with the English translation from the related CN Patent Application No. 202210089424.4, Jun. 16, 2025, 18 sheets.

* cited by examiner

CHILD SAFETY SEAT

CROSS REFERENCE TO RELATED APPLICATION

The present disclosure claims priority to CN Patent Application Serial No. 202210089424.4, entitled "CHILD SAFETY SEAT" filed on Jan. 25, 2022, the content of which is incorporated herein by reference in its entirety.

TECHNICAL FIELD

The present disclosure relates to the technical field of a child safety seat, in particular to a child safety seat with a headrest height adjustment structure.

BACKGROUND

A child safety seat has become an essential carrier for children to travel. In order to adapt to growing children, the existing child safety seat is provided with a headrest with adjustable height. However, the height of the shoulder belt used to restrain children may not change when adjusting height of the headrest of the existing child safety seat, so that the shoulders of children with higher height cannot be well matched with the shoulder belt when using the existing child safety seat.

In addition, the way of adjusting the height of the headrest of the existing child safety seat is not flexible enough, and the operation is inconvenient.

SUMMARY

The present disclosure relates to a child safety seat capable of simultaneously adjusting the height of shoulder belt while adjusting the height of a headrest.

In particular, the present disclosure relates to a child safety seat, which includes a backrest; a headrest formed with a shoulder belt hole; and a shoulder belt extending through the shoulder belt hole, wherein a back surface of the headrest has a first connector and a front surface of the backrest has a second connector, and the first connector is attached to the second connector in a height adjustable manner.

In one embodiment, the first connector is one of male and female Hook & Loop fastener, and the second connector is the other of the male Hook & Loop fastener and a female Hook & Loop fastener.

In one embodiment, the first connector is an adjustment sheet, the adjustment sheet is formed with a plurality of adjustment holes penetrating therethrough, the second connector is an adjustment belt, one end of the adjustment belt is fixed to the backrest and the other end of the adjustment belt is fixedly or detachably connected to the backrest, and the adjustment belt is penetrated between the adjustment sheet and the headrest from one of the adjustment holes and penetrated out of the adjustment sheet from another of the adjustment holes, so that the adjustment sheet and/or the adjustment holes exert a retaining force on the adjustment belt.

In one embodiment, the first connector includes a connecting belt and a connecting sheet, one end of the connecting belt is fixed to the headrest, the other end of the connecting belt has the connecting sheet, the second connector includes an adjustment belt and a fastener, one end of the adjustment belt is fixed to the backrest, and the other end of the adjustment belt is fixedly or detachably connected to the backrest, the fastener is movably disposed on the adjustment belt, the connecting belt passes through the fastener, and the connecting sheet cooperates with the fastener to prevent the headrest from being separated from the backrest.

In one embodiment, the fastener is a fastener with a plurality of holes, the adjustment belt passes through one hole of the plurality of holes, and the connecting sheet is larger in size than the hole of the plurality of holes.

In one embodiment, the second connector includes two adjustment belts, and both ends of each of the two adjustment belts are located at different heights.

In one embodiment, the adjustment belt is formed with a plurality of holes along a length direction thereof.

In one embodiment, all peripheral edges of the adjustment sheet are fixed to the headrest.

In one embodiment, only one side of peripheral edges of the adjustment sheet is fixed to the headrest.

In one embodiment, the headrest has two adjustment sheets, the two adjustment sheets are arranged side by side, and only one side of each of the two adjustment sheets close to each other is fixed to the headrest.

In one embodiment, the headrest includes a pocket, and a portion of the adjustment sheet is inserted into the pocket.

In one embodiment, the headrest includes a fixing belt, an end of the fixing belt is fixed to the headrest, and the other end of the fixing belt is detachably connected to a first surface of the adjustment sheet.

In one embodiment, the headrest is detachably connected to a second surface of the adjustment sheet, and the first surface is opposite to the second surface.

In one embodiment, the end of the fixing belt is located within the pocket.

In one embodiment, the portion of the adjustment sheet is connected to the pocket by a button.

In one embodiment, the headrest includes a constraint ring, and the adjustment sheet passes through the constraint ring.

BRIEF DESCRIPTION OF THE DRAWINGS

The present disclosure will become more apparent by considering the following detailed description of preferred embodiments of the present disclosure in conjunction with the accompanying drawings. The drawings are only exemplary illustrations of the present disclosure and are not necessarily drawn to scale. Throughout the drawings like reference numerals denote identical or similar parts throughout, in which.

Figure 1:
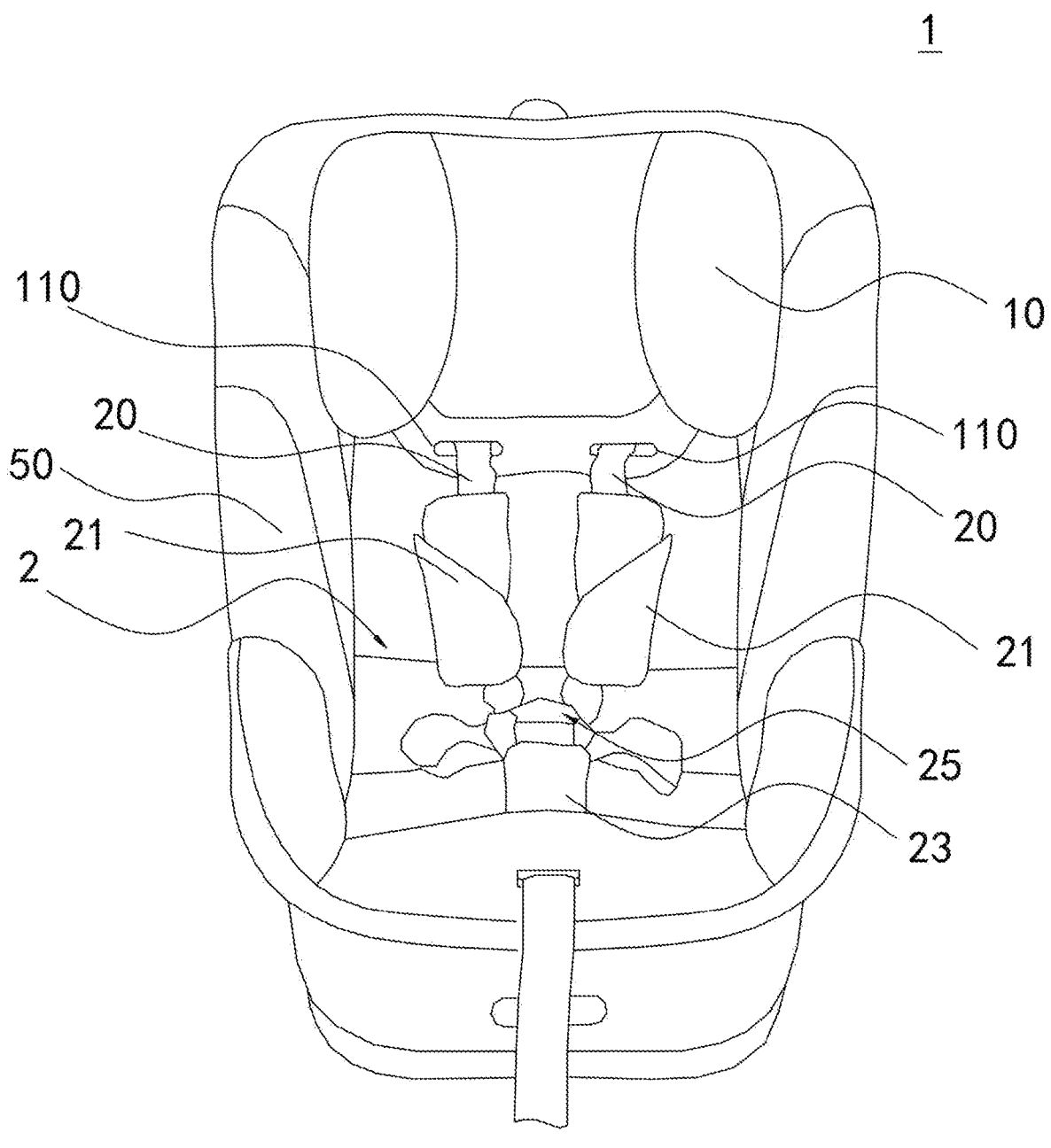
FIG. 1 is a schematic diagram of a child safety seat of the present disclosure with a headrest in a lower position.

LIST OF REFERENCE NUMBERS child safety seat 1
headrest 10
shoulder belt hole 110
pocket 120
fixing belt 130
first attachment portion 140
second attachment portion 150
constraint ring 160
connecting hole 170
seat belt 2
shoulder belt 20
adjustment belt 21
crotch belt 23
buckle 25
first connector 30
adjustment sheet 310
adjustment hole 311
fixing arm 312
connecting belt 320
connecting sheet 330
connecting portion 340
second connector 40
adjustment belt 410
hole 411
fastener 420
backrest 50

DETAILED DESCRIPTION

For a clearer explanation of the overall concept of the present disclosure, a detailed description is given by way of example in conjunction with the accompanying drawings of the specification.

It should be noted that many specific details are set forth in the following description to facilitate a full understanding of the present disclosure, but the present disclosure may also be practiced in other ways other than those described herein, and therefore the scope of protection of the present disclosure is not limited by the specific embodiments disclosed below.

In addition, in the description of the present disclosure, it should be understood that the terms such as "center", "upper", "lower", "front", "back", "left", "right", "vertical", "horizontal", "top", "bottom", "inner", "outer", "axial", "radial", "circumferential", and the like indicate an orientation or positional relationship based on the drawings, which is intended for ease of description and simplification of the description only, and is not intended to indicate or imply that the recited device or assembly must have a particular orientation, be constructed and operate in a particular orientation, and thus cannot be construed as limiting of the present disclosure.

In the present disclosure, the terms such as "mounted", "coupled", "connected", "fixed", and the like should be understood in a broad sense and may be, for example, a fixed connection, a detachable connection, or integral, unless otherwise expressly specified and limited. It can be a directly connection, an indirectly connection through intermediate media, an internal connection of two components, or an interaction relationship between two components. However, indicating the direct connection means that the connection between the two subjects does not build a connection relationship through a transition structure, but only forms a whole through the connection structure. The specific meanings of the above terms in the present disclosure may be understood according to the specific situation to those of ordinary skill in the art.

In the present disclosure, the first feature being "above" or "below" the second feature may be a direct contact between the first and second features, or an indirect contact between the first and second features via intermediate media, unless otherwise expressly specified and defined. In the description of this specification, descriptions of the reference terms such as "one embodiment", "some embodiments", "example", "specific example", "some examples", and the like mean that specific features, structures, materials, or characteristics described in connection with the embodiment or example are included in at least one embodiment or example of the present disclosure. In the present disclosure, the schematic expression of the above terms need not be directed to the same embodiments or examples. Further, the specific features, structures, materials or characteristics described may be combined in a suitable manner in any one or more embodiments or examples.

The present disclosure provides a child safety seat, which may be installed on a seat of a vehicle for a baby or a child to ride, and ensures the safety of a rider. A first embodiment of the present disclosure will be described below.

Figure 2:
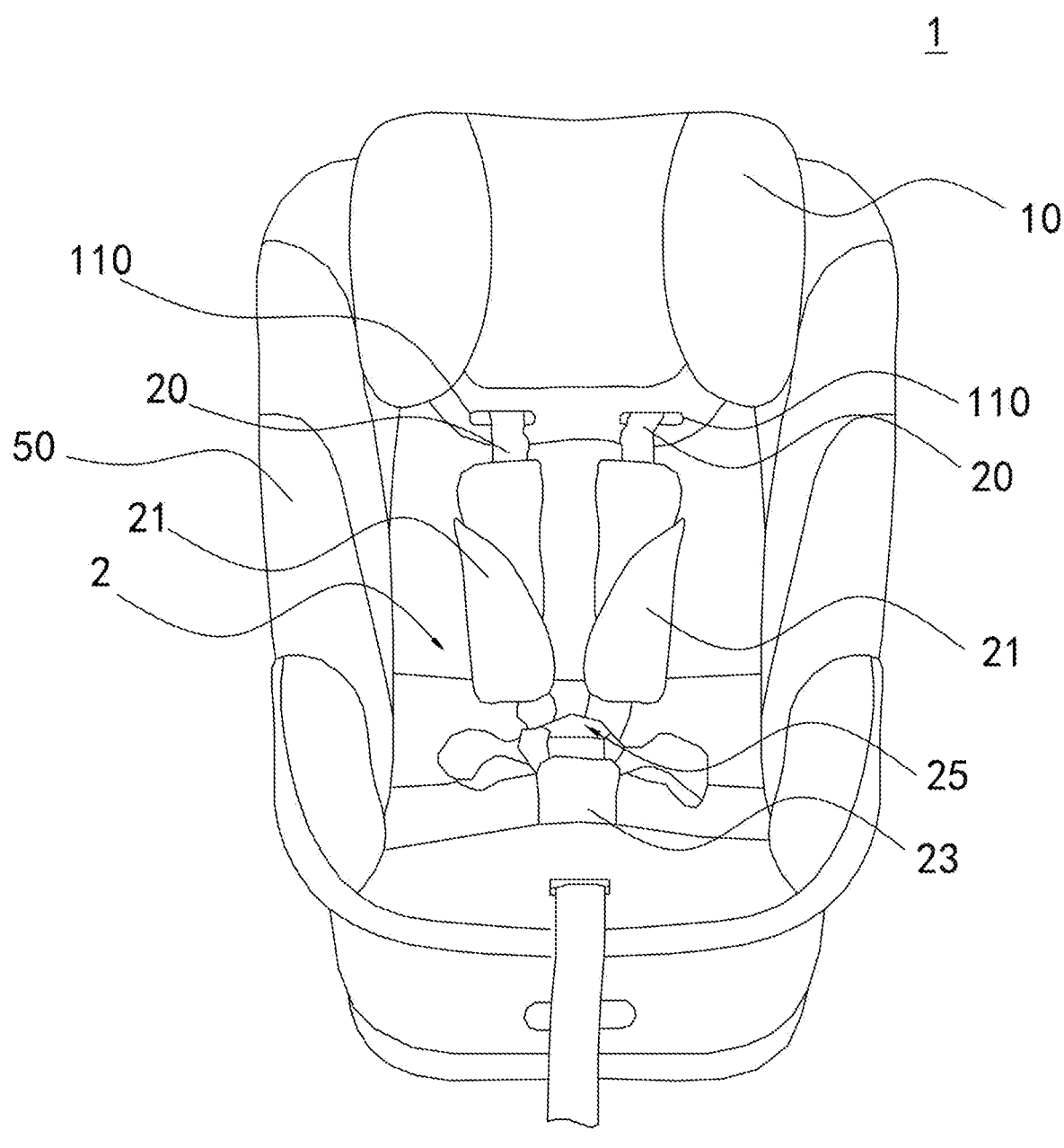
FIG. 2 is a schematic diagram of a child safety seat of the present disclosure with a headrest in a higher position.

As shown in FIGS. 1 and 2, the child safety seat 1 may include: a backrest 50; a headrest 10 formed with a shoulder belt hole 110; a seat belt 2 attached to a housing. The seat belt 2 may include a shoulder belt 20 and an adjustment belt 21. The adjustment belt 21 may not be necessary and may be removed. The shoulder belt 20 may extend through the shoulder belt hole 110. A back surface of the headrest 10 may have a first connector 30 and a front surface of the backrest 50 may have a second connector 40. The first connector 30 is attached to the second connector 40 in a height adjustable manner.

The shoulder belt 20 may be configured as two. The two shoulder belts 20 correspond to two shoulders of a child. The front sides of the two shoulder belts 20 may be detachably engaged with a crotch belt 23 of the child safety seat, for example, by means of a buckle 25, such that both outward pull-out movement and inward retraction movement of the adjustment belt 21 are not allowed in a locked state. The seat belt 2 and the buckle 25 have structures involved in the related art which will not be described herein.

The backrest 50 extends generally vertically. Alternatively, the backrest 50 may be slightly tilted back. The headrest 10 may be provided at a higher position of the backrest 50 to support and protect the head of a rider. The shoulder belt 20 may be formed as two, symmetrically disposed in front of the backrest. Lower ends of the shoulder belts 20 may be fixed to a cushion of the child safety seat 1 and upper ends of the shoulder belts 20 may be fixed to the backrest 50 of the child safety seat 1. The shoulder belts 20 may slide relative to the shoulder belt hole 110 to adjust its length exposed to the front of the child safety seat 1. The shoulder belts 20 may be used to restrain the shoulders of the rider, thereby protecting the safety of the rider.

Figure 3:
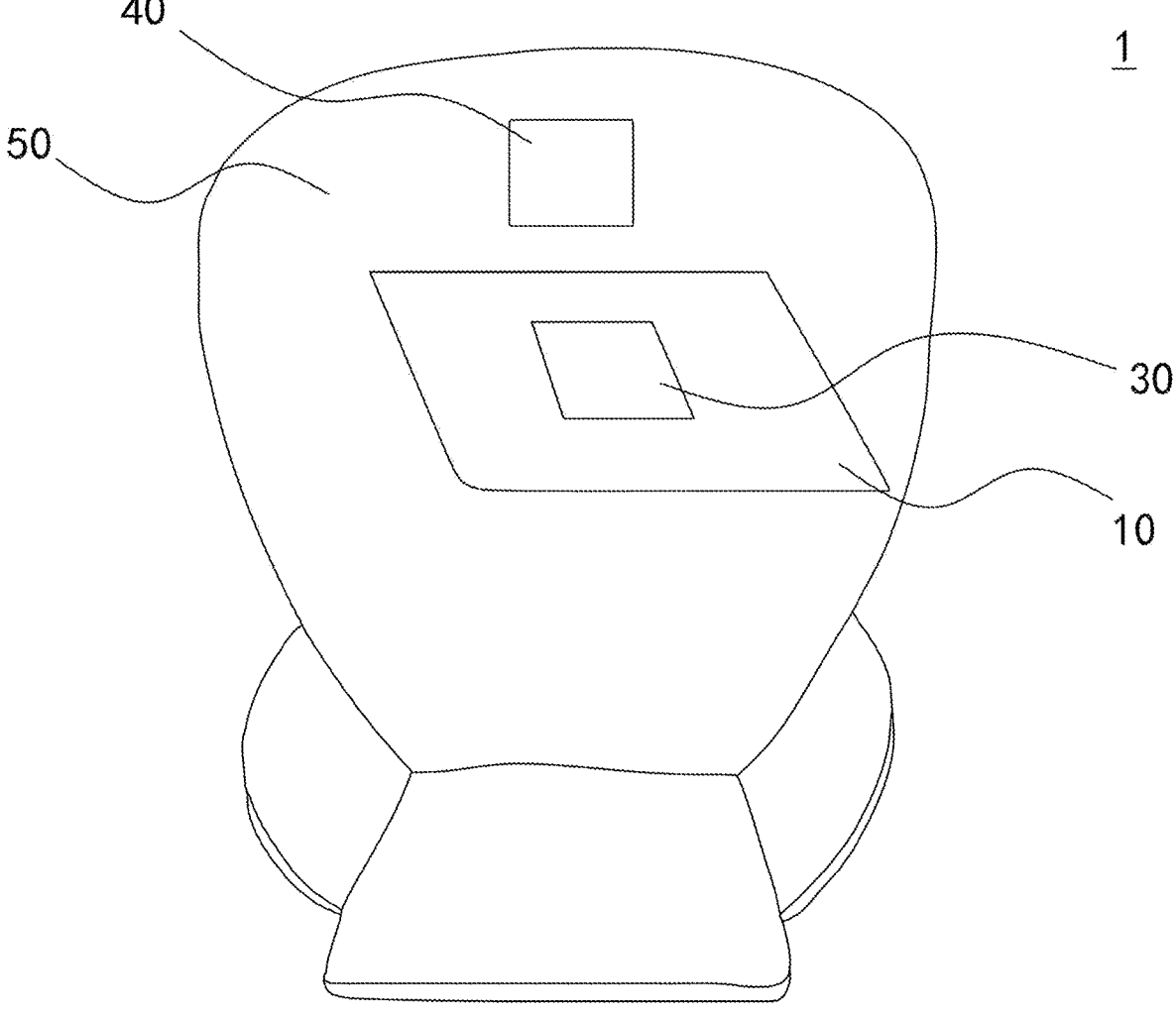
FIG. 3 is a schematic diagram of a first embodiment of a child safety seat of the present disclosure in which a headrest is in a position separated from a backrest.

The shoulder belt hole 110 may be provided at a lower position of the headrest 10, so as not to interfere with support of the headrest 10 to the head of the rider. In the embodiment, the first connector 30 may be one of a male Hook & Loop fastener and a female Hook & Loop fastener, and the second connector 40 may be the other of the male Hook & Loop fastener and the female Hook & Loop fastener. It can be understood that the Hook & Loop fastener is generally composed of two parts, the fastener with hook-shaped members on a surface thereof may generally be referred to as the male Hook & Loop fastener, and the fastener with ring-shaped members on a surface thereof may generally be referred to as the female Hook & Loop fastener. As shown in FIG. 3, the first connector 30 and the second connector 40 may be formed as squares of equal area, and the side lengths of the squares may be, for example, 5 cm, 6 cm, 7 cm, 8 cm, 9 cm, 10 cm, or greater than 10 cm. The first connector 30 and the second connector 40 may also be formed in squares of different sizes, for example, the area of the first connector 30 is smaller than the area of the second connector 40, and specifically, the side length of the first connector 30 may be, for example, half of the side length of the second connector 40, and the present disclosure is not limited thereto. The first connector 30 and the second connector 40 may be otherwise formed, for example, to have a rectangular shape, an oval shape, a circular shape, or the like.

As shown in FIGS. 1 and 2, when the headrest 10 is provided at a lower position and a higher position, since the shoulder belt hole 110 is provided on the headrest 10, the upper ends of the shoulder belts 20 move with the movement of the headrest 10, so that the position of the shoulder belts 20 may also be adjusted according to the change of the height of the rider. Such a structure makes the child safety seat 1 have better adaptability and convenient operation.

A second embodiment of the present disclosure will be described below.

Figure 4:
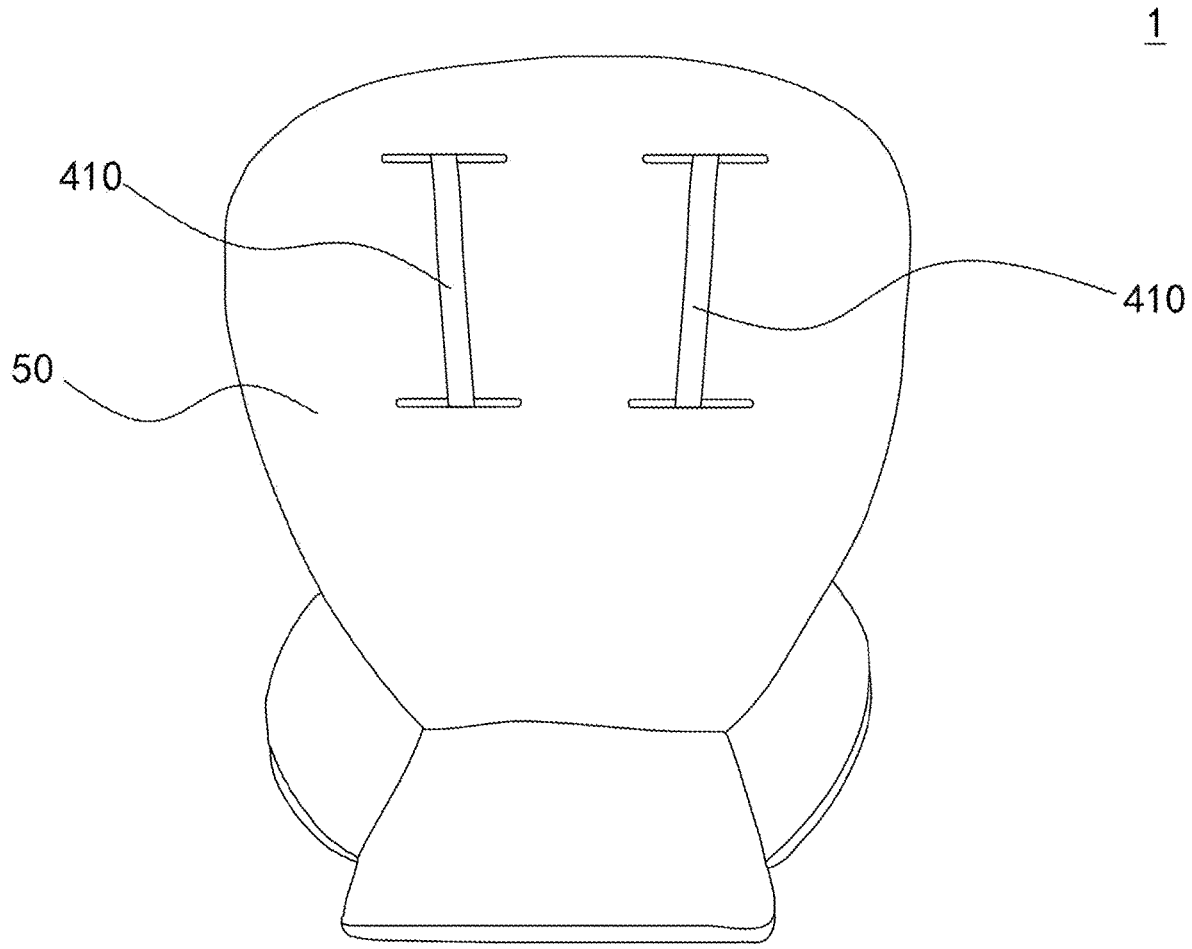
FIG. 4 is a schematic diagram of a second embodiment of a child safety seat of the present disclosure in which a headrest and a shoulder belt are removed.
Figure 5:
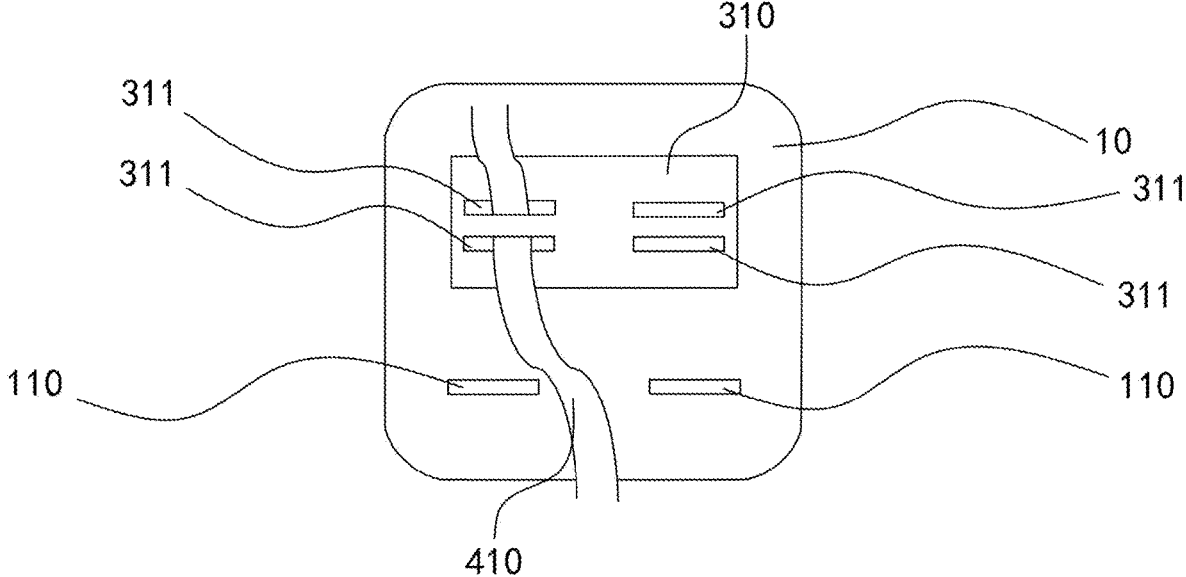
FIG. 5 is a rear schematic view of a headrest of a second embodiment of a child safety seat of the present disclosure.

Referring to FIGS. 4-5, the first connector 30 may be an adjustment sheet 310. The adjustment sheet 310 may be formed with a plurality of adjustment holes 311 penetrating therethrough. The adjustment sheet 310 may be a PE plate. As shown in FIG. 5, four adjustment holes 311 may be formed on the adjustment sheet 310 and each two adjustment holes 311 forms a row. Other numbers of adjustment holes 311 may also be formed on the adjustment sheet 310. The adjustment sheet 310 may be engaged with a rear surface of the headrest 10 at a peripheral edge, while only maintaining contact with the headrest 10 at an intermediate position (e.g., the position where the adjustment holes 311 are located), and may have a certain gap between intermediate position and the headrest 10 under the application of force.

The second connector 40 may be an adjustment belt 410. One end of the adjustment belt 410 may be fixed to the backrest 50 and the other end of the adjustment belt 410 may be fixedly or detachably connected to the backrest 50. When the other end of the adjustment belt 410 is provided to be detachably connected to the backrest 50, the headrest 10 may be detached from the backrest 50, such that operations such as clean, maintenance and replacement may be conveniently performed. The adjustment belt 410 is penetrated between the adjustment sheet 310 and the headrest 10 from one of the adjustment holes 311 and penetrated out of the adjustment sheet 310 from another adjustment hole 311, so that the adjustment sheet 310 exerts a retaining force on the adjustment belt 410. When the number of adjustment holes 311 in each row is more than two (for example, four), the adjustment belt 410 may be successively penetrated in and out of the respective adjustment holes 311 in one row, so that the magnitude of the retaining force may be changed. As shown in FIG. 4, the adjustment belts 410 may be arranged as two side-by-side (although only one adjustment belt 410 is shown in FIG. 5, it can be understood that the two adjustment holes 311 on the right side may also be provided with the adjustment belt 410), and the present disclosure is not limited thereto. The adjustment belt 410 may also be provided with one belt or more than two belts.

Referring to FIG. 5, the adjustment belt 410 is subjected to the retaining force (or a clamping force) from the adjustment sheet 310, since the adjustment belt 410 is penetrated in and out of the adjustment holes 311. Alternatively or additionally, the width of the adjustment hole 311 may be set close to the thickness of the adjustment belt 410, such that the adjustment belt 410 is subjected to a retaining force from the adjustment holes 311. In addition, a portion of the adjustment belt 410 located between the adjustment sheet 310 and the headrest 10 may be subjected to a retaining force provided by the adjustment sheet 310 and the headrest 10 together. When it is necessary to adjust the height of the headrest 10, the headrest 10 is moved by overcoming the resistance (retaining force) of the adjustment sheet 310 and the adjustment holes 311 to the headrest 10.

A third embodiment of the present disclosure will be described below.

Figure 6:
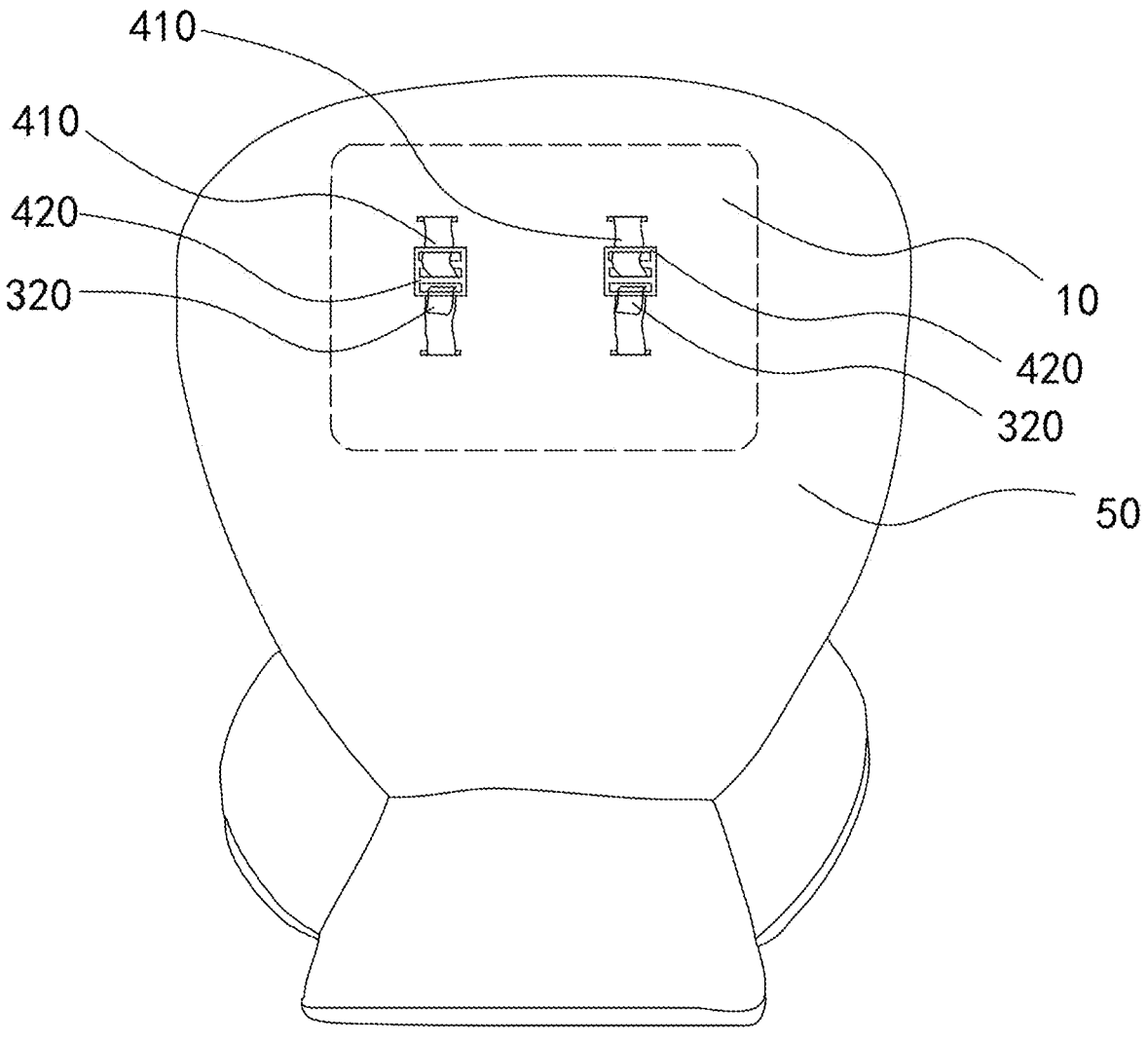
FIG. 6 is a schematic diagram of a third embodiment of a child safety seat of the present disclosure in which an outer profile of a headrest is shown in a dotted line and components blocked by the headrest are shown.
Figure 7:
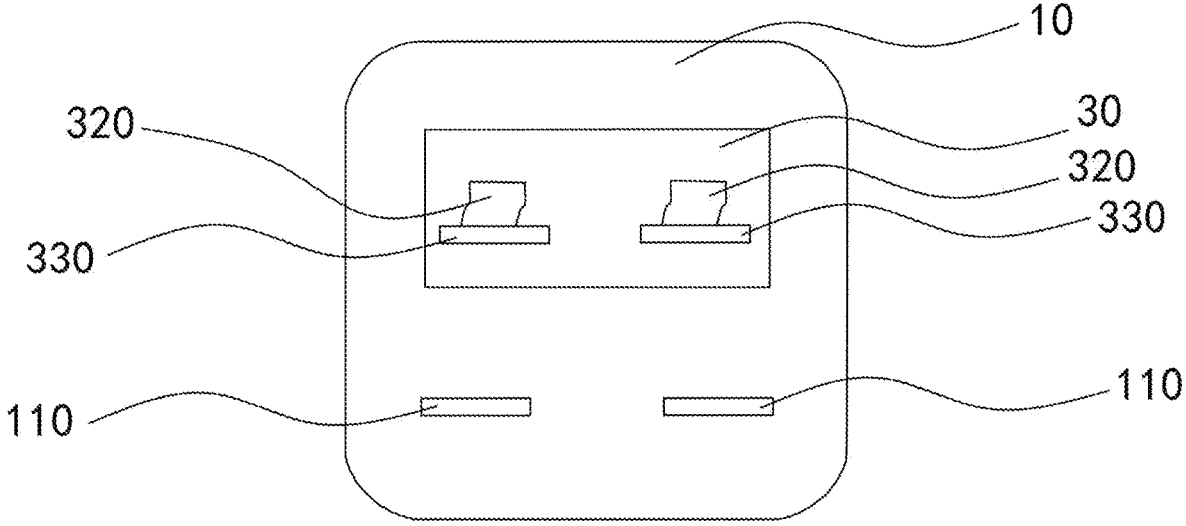
FIG. 7 is a rear schematic view of a headrest of a third embodiment of a child safety seat of the present disclosure.

Referring to FIGS. 6-7, the first connector 30 may include a connecting belt 320 and a connecting sheet 330. One end of the connecting belt 320 may be fixed to the headrest 10. The other end of the connecting belt 320 may have the connecting sheet 330. The connecting sheet 330 may be formed of rigid plastic and may be generally perpendicular to the connecting belt 320.

The second connector 40 may include the adjustment belt 410 and a fastener 420. One end of the adjustment belt 410 may be fixed to the backrest 50, and the other end of the adjustment belt 410 may be fixedly or detachably connected to the backrest 50. When the other end of the adjustment belt 410 is provided to be detachably connected to the backrest 50, the headrest 10 may be detached from the backrest 50, such that operations such as clean, maintenance and replacement may be conveniently performed. Both ends of the adjustment belt 410 are located at different heights. The fastener 420 is movably disposed on the adjustment belt 410. A sufficient retaining force can be formed between the adjustment belt 410 and the fastener 420. The connecting belt 320 may pass through the fastener 420 and the connecting sheet 330 may cooperate with the fastener 420 to prevent the headrest 10 from being separated from the backrest 50.

Specifically, as shown in FIG. 6, the fastener 420 may be a fastener having a "目" shape (a buckle with three holes). For example, the "目"-shaped fastener may be a fastener with three holes. Alternatively, the fastener 420 includes a plurality of holes. The "目"-shaped fastener may be understood as a fastener with a shape close to the Chinese character "目", which has three holes arranged vertically. The adjustment belt 410 may pass through one hole (e.g., the lowermost hole) of the "目"-shaped fastener, and the connecting sheet 330 is larger in size than the hole of the "目"-shaped fastener. Thus, because the connecting sheet 330 is blocked by the fastener 420 at a rear side of the fastener 420, the headrest 10 is attached to the backrest 50 and cannot be separated.

In the embodiment, each of the connecting belt 320, the connecting sheet 330, the adjusting belt 410, and the fastener 420 may be symmetrically formed as two. The adjustment belt 410 is generally vertically oriented to provide a height adjustable range of the headrest 10. The connecting belt 320 may have a shorter length which may be set to facilitate the connecting sheet 330 to pass through the fastener 420 without causing the headrest 10 to shake significantly with respect to the backrest 50.

The connecting sheet 330 may be formed as a rectangular sheet member. Alternatively, the connecting sheet 330 is provided to pass through the hole of the "⊓"-shaped fastener by rotation of a specific angle, such that the headrest 10 can be separated from the backrest 50.

A fourth embodiment of the present disclosure will be described below. The fourth embodiment is similar to the second embodiment and only the difference part will be described below.

Figure 8:
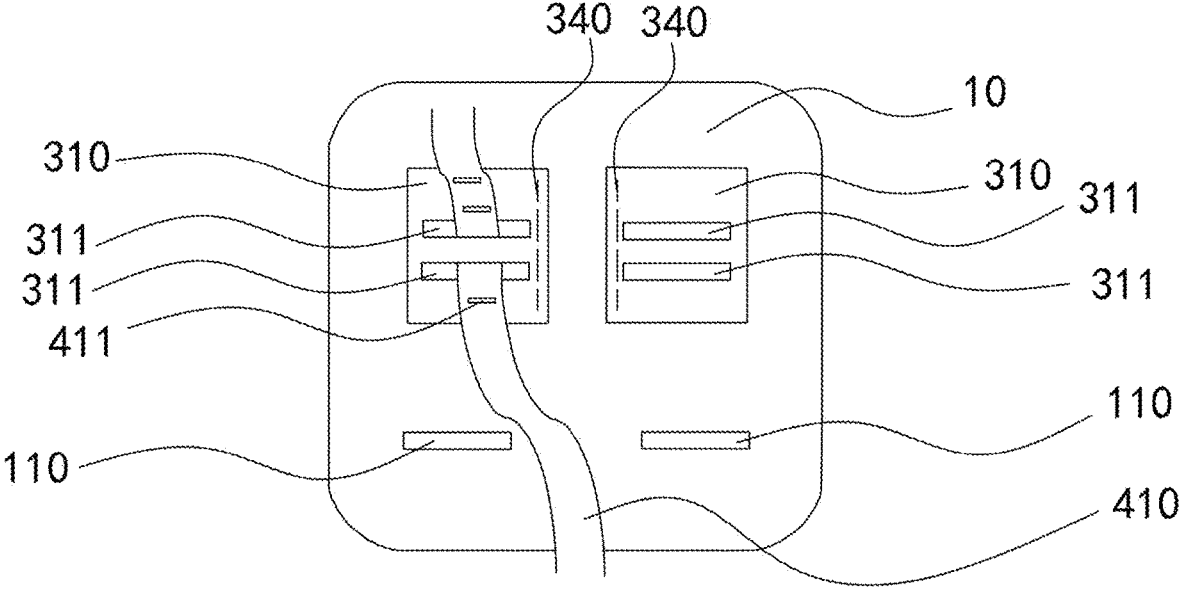
FIG. 8 is a rear schematic view of a headrest of a fourth embodiment of a child safety seat of the present disclosure.

Referring to FIG. 8, the adjustment belt 410 is formed with a plurality of holes 411 along a length direction thereof. These holes 411 may cause the surface of the adjustment belt 410 to form a certain fluctuation, so that the retaining force between the adjustment belt 410 and the connecting sheet 330 may be increased. Although only one adjustment belt 410 is shown in FIG. 8, there are preferably two adjustment belts 410 arranged side by side. The adjustment sheets 310 may be formed as two arranged side by side at the same height. The adjustment sheet 310 may be connected to the headrest 10 only at one side, that is, the adjustment sheet 310 may form a connecting portion 340 at only one side. Alternatively, the two adjustment sheets 310 form the connecting portions 340 only on inner sides (sides close to each other). In this way, the other sides (upper, lower, and outer sides) of the adjustment sheet 310 may be separated from the headrest 10, thereby allowing the headrest 10 to be separated from the backrest 50 by a limited distance. This is beneficial to the convenience of operation when adjusting the height of the headrest 10. The use of the two separate adjustment sheets 310 may save material and may keep the headrest 10 stably attached to the backrest 50 with only one side of the adjustment sheet 310 fixed to the headrest 10. The above structure in the embodiment may also be applied to other embodiments.

A fifth embodiment of the present disclosure will be described below. The fifth embodiment is similar to the second embodiment and only the difference part will be described below.

Figure 9:
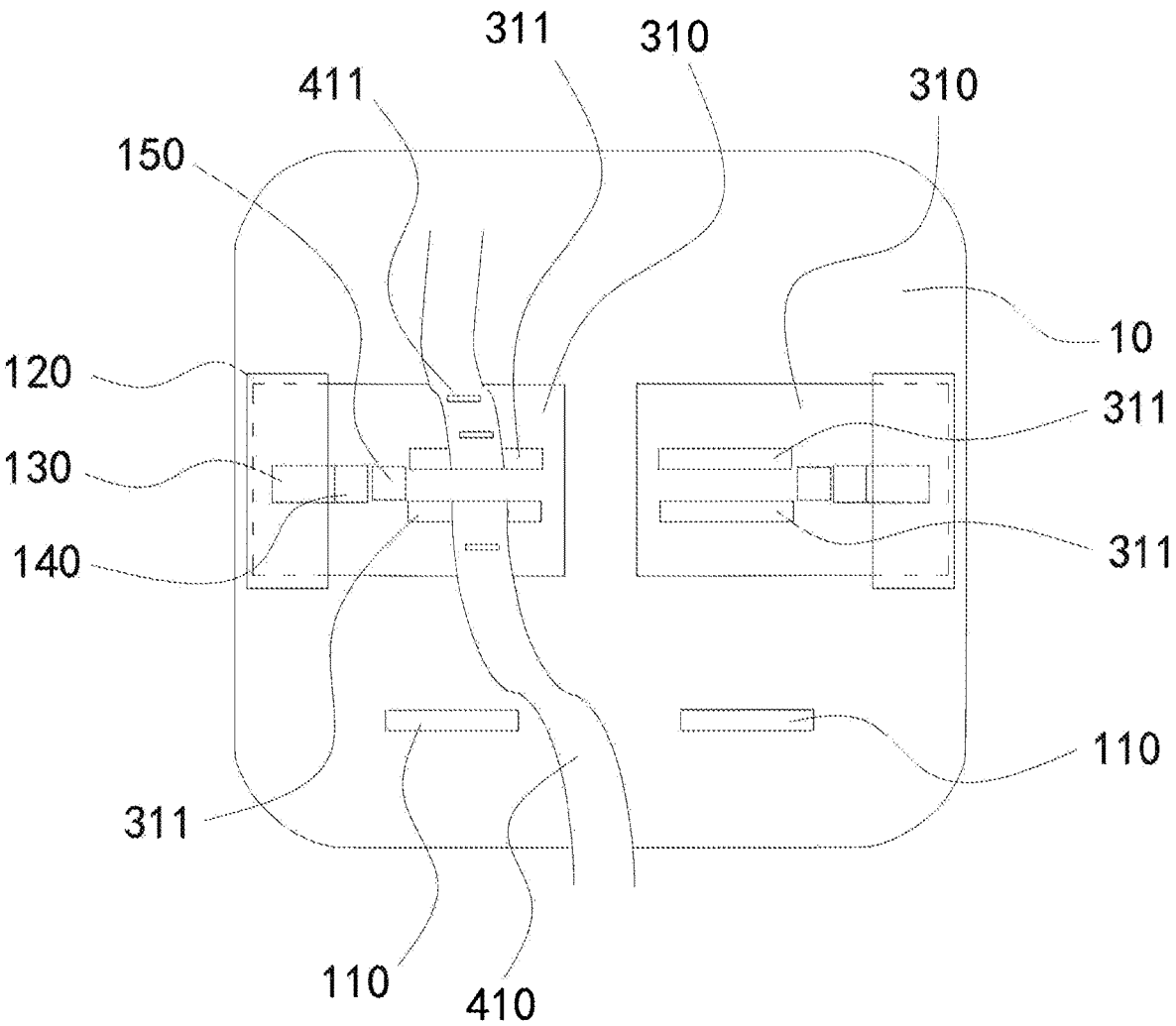
FIG. 9 is a rear schematic view of a headrest of a fifth embodiment of a child safety seat of the present disclosure.

Referring to FIG. 9, although only one adjustment belt 410 is shown in FIG. 9, there are preferably two adjustment belts 410 arranged side by side. The adjustment sheets 310 may be formed as two arranged side by side at the same height. The headrest 10 may include a pocket 120. A portion of each adjustment sheet 310 (an outer side in FIG. 9) may be inserted into the pocket 120. The pocket 120 is, for example, a sheet member covering the headrest 10, wherein a portion of the periphery of the sheet member (e.g., upper, lower, and left sides for the left pocket 120 in FIG. 9) is attached to the headrest 10, while the remaining portion of the periphery of the sheet member (e.g., a right side for the left pocket 120 in FIG. 9) is not attached to the headrest 10, so that an opening may be formed. To facilitate insertion of the adjustment sheet 310 into the pocket 120, the adjustment sheet may be foldable.

The headrest 10 may include a fixing belt 130. The fixing belt 130 may be a fabric belt. One end of the fixing belt 130 may be fixed to the headrest 10, for example, to a position of the headrest 10 within the pocket 120. The other end of the fixing belt 130 may be detachably connected (e.g., by a Hook & Loop fastener) to a first surface of the adjustment sheet 310 (e.g., a surface of the adjustment sheet 310 facing the backrest 50) to form a first attachment portion 140.

A portion of the adjustment sheet 310 and the fixing belt 130 is shown as a dotted line in FIG. 9, indicating that the portion is blocked from being visible by the pocket 120.

The headrest 10 may be detachably connected (e.g., by a Hook & Loop fastener) to a second surface of the adjustment sheet 310 to form a second attachment portion 150. For example, the second surface is a surface of the adjustment sheet 310 facing the headrest 10. That is, the first surface is opposite to the second surface. The second attachment portion 150 may be located at a substantially central position of the adjustment sheet 310. The second attachment portion 150 may also be located in other locations. Although the second attachment portion 150 is formed on a left side of the adjustment hole 311 in FIG. 9, it can be understood that the second attachment portion 150 may also be formed on a right side of the adjustment hole 311. By the first attachment portion 140 and the second attachment portion 150, the adjustment sheet 310 may form a stable and reliable connection with the headrest 10, while the adjustment sheet 310 may be separated from the headrest 10, and the headrest 10 may be prevented from shaking.

The second attachment portion 150 is shown as a dotted line in FIG. 9, indicating that the second attachment portion 150 is formed on the surface of the adjustment sheet 310 facing the headrest 10 and is invisible.

The adjustment belt 410 may be formed with a plurality of holes 411 along a length direction thereof. These holes 411 can cause the surface of the adjustment belt 410 to form a certain fluctuation, so that the retaining force with the connecting sheet 330 may be increased.

Although two adjustment sheets 310 separated from each other are shown in FIG. 9, it can be understood that the adjustment sheet 310 may also be integrally formed. At this time, each of the left and right sides of the integrally formed adjustment sheet 310 may be respectively formed with a pocket 120, two first attachment portions 140 may be respectively provided on both sides, and one second attachment portion 150 may be centrally provided at the center of the adjustment sheet 310. Alternatively, the adjustment sheet 310 may be formed with the connecting portion 340 as in the fourth embodiment.

A sixth embodiment of the present disclosure will be described below. The sixth embodiment is similar to the fifth embodiment and only the difference part will be described below.

Figure 10:
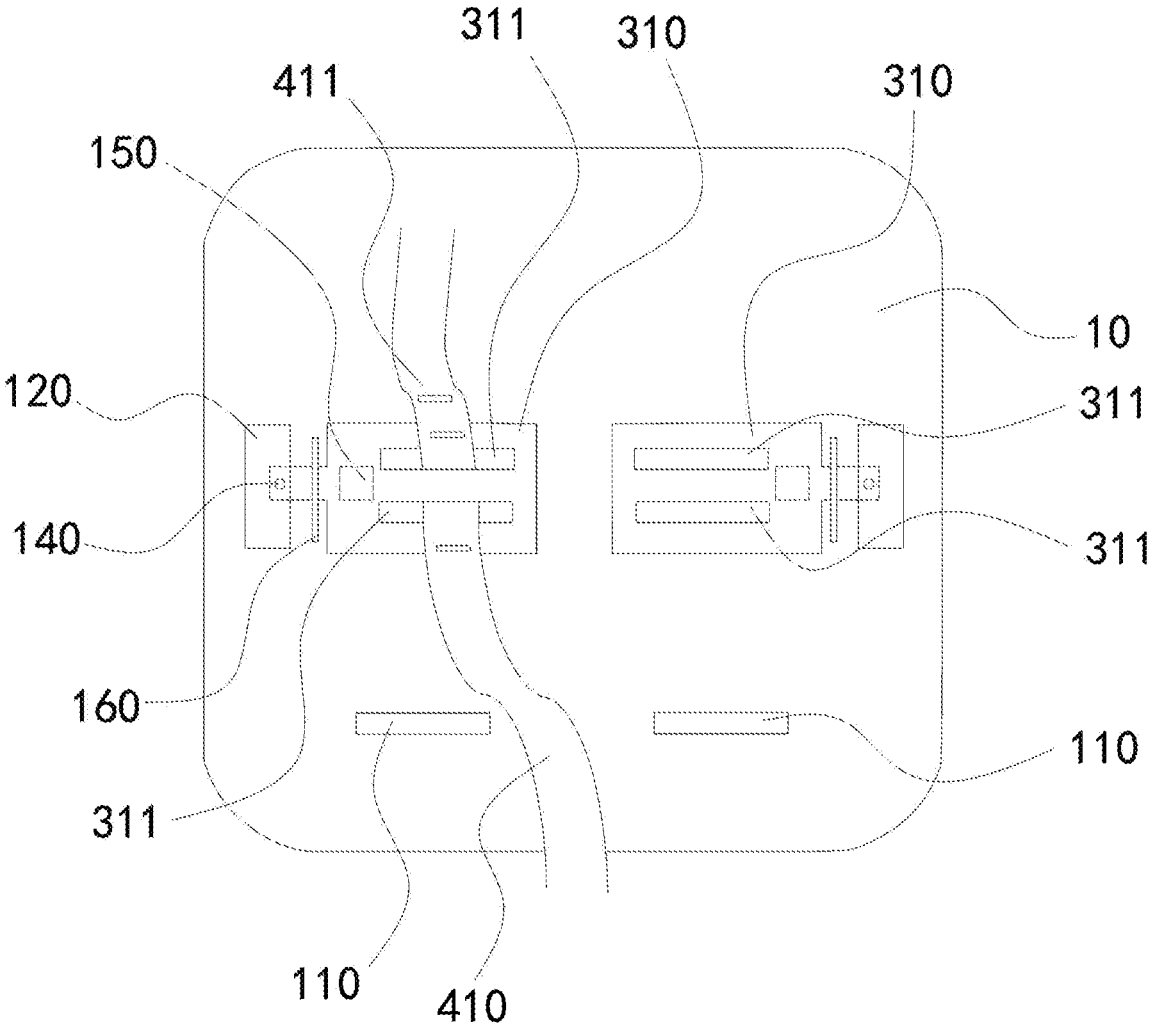
FIG. 10 is a rear schematic view of a headrest of a sixth embodiment of a child safety seat of the present disclosure.

Referring to FIG. 10, in the embodiment, the fixing belt 130 may not be formed. A portion of each adjustment sheet 310 (for example, a left portion thereof for the left adjustment sheet 310) may be inserted into the pocket 120 and detachably connected to the headrest 10 by means of an element such as a button (for example, the button is provided on the adjustment sheet 310 and a hole for engaging the button is provided at a corresponding position on the pocket 120) or a snap-button to form the first attachment portion 140.

A portion of the adjustment sheet 310 and the fixing belt 130 is shown as a dotted line in FIG. 10, indicating that the portion is blocked from being visible by the pocket 120. Likewise, the second attachment portion 150 is shown as a dotted line in FIG. 10, indicating that the second attachment portion 150 is formed on the surface of the adjustment sheet 310 facing the headrest 10 and is invisible.

The headrest 10 may include a constraint ring 160. The adjustment sheet 310 may pass through the constraint ring 160, such that the constraint ring 160 constrains and fixes the adjustment sheet 310 to some extent. A portion of the adjustment sheet 310 that passes through the constraint ring 160 and a portion of the adjustment sheet 310 that is inserted into the pocket 120 may have a smaller width (a dimension in an up-down direction as shown in FIG. 10) than other portions, thereby facilitating the adjustment sheet 310 to pass through the constraint ring 160 and to be inserted into the pocket 120.

In the present embodiment, because the first attachment portion 140 and the second attachment portion 150 are provided, the adjustment sheet 310 may form a stable and reliable connection with the headrest 10, while the adjustment sheet 310 may be separated from the headrest 10, and the headrest 10 may be prevented from shaking. The first attachment portion 140 arranged in the pocket 120 is less likely to be unexpectedly opened, thereby ensuring that the adjustment sheet 310 and the headrest 10 are not unexpectedly separated.

A seventh embodiment of the present disclosure will be described below. The seventh embodiment is similar to the sixth embodiment, and only the difference parts will be described below.

Figure 11:
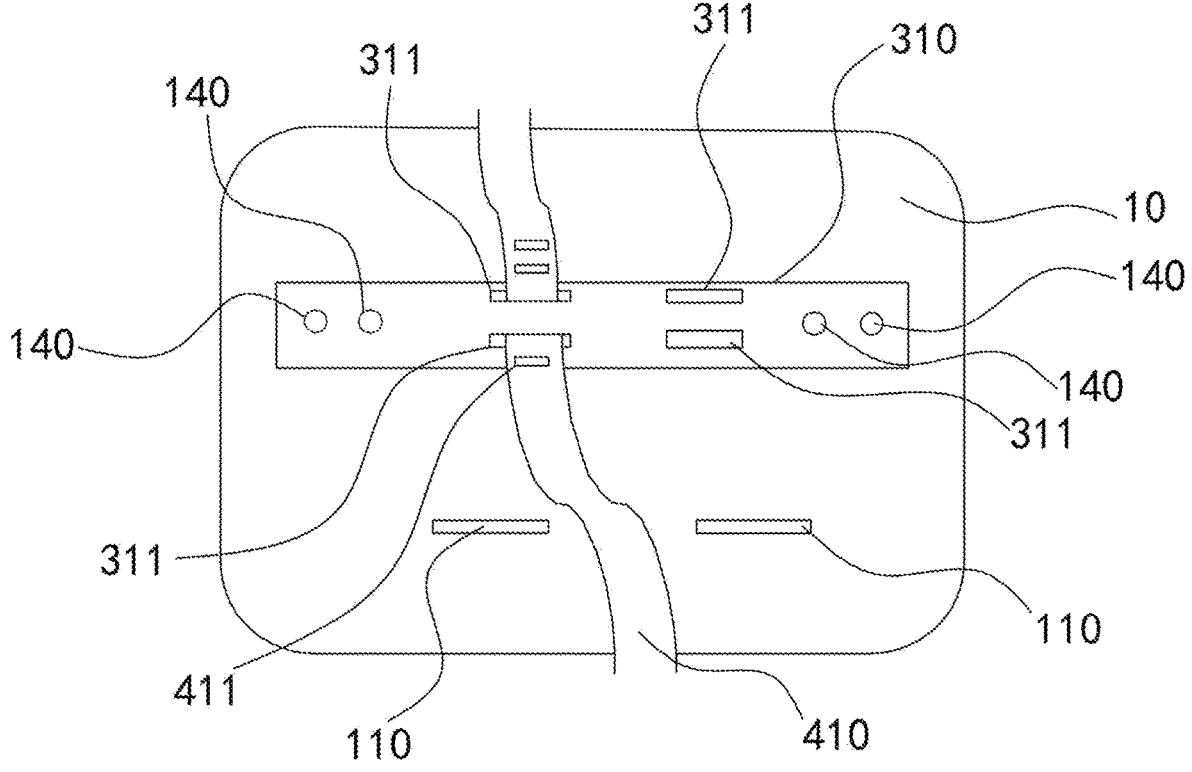
FIG. 11 is a rear schematic view of a headrest of a seventh embodiment of a child safety seat of the present disclosure.

Referring to FIG. 11, in the present embodiment, the adjustment sheet 310 may be integrally formed, but the present disclosure is not limited thereto. The adjustment sheet 310 may be formed as a rectangle (i.e., having a uniform width), but the present disclosure is not limited thereto. Both ends of the adjustment sheet 310 are detachably connected to the headrest 10 by the first attachment portion (button) 140. Two buttons may be disposed at each end of the adjustment sheet 310 to form a stable fastening force, but the number of buttons is not limited in the application. Two portions of the first attachment portion (button) 140 are provided at corresponding positions on the adjustment sheet 310 and the headrest 10, respectively.

Although only one adjustment belt 410 is shown in FIG. 11, there may be two adjustment belts 410 arranged side by side symmetrically in the present embodiment. The first attachment portion 140 is shown as a dotted line in FIG. 11, indicating that the first attachment portion 140 is blocked by the adjustment sheet 310.

In the present embodiment, the pocket 120, the second attachment portion 150 and the constraint ring 160 may not be provided. Other parts of the embodiment may be referred to the sixth embodiment.

In the present embodiment, because there are a plurality of first attachment portions (buttons) 140, the adjustment sheet 310 may form a stable and reliable connection with the headrest 10, while the adjustment sheet 310 may be separated from the headrest 10, and the headrest 10 may be prevented from shaking, thereby facilitating operation and low cost.

An eighth embodiment of the present disclosure will be described below. The eighth embodiment is similar to the seventh embodiment and only the difference part will be described below.

Figure 12:
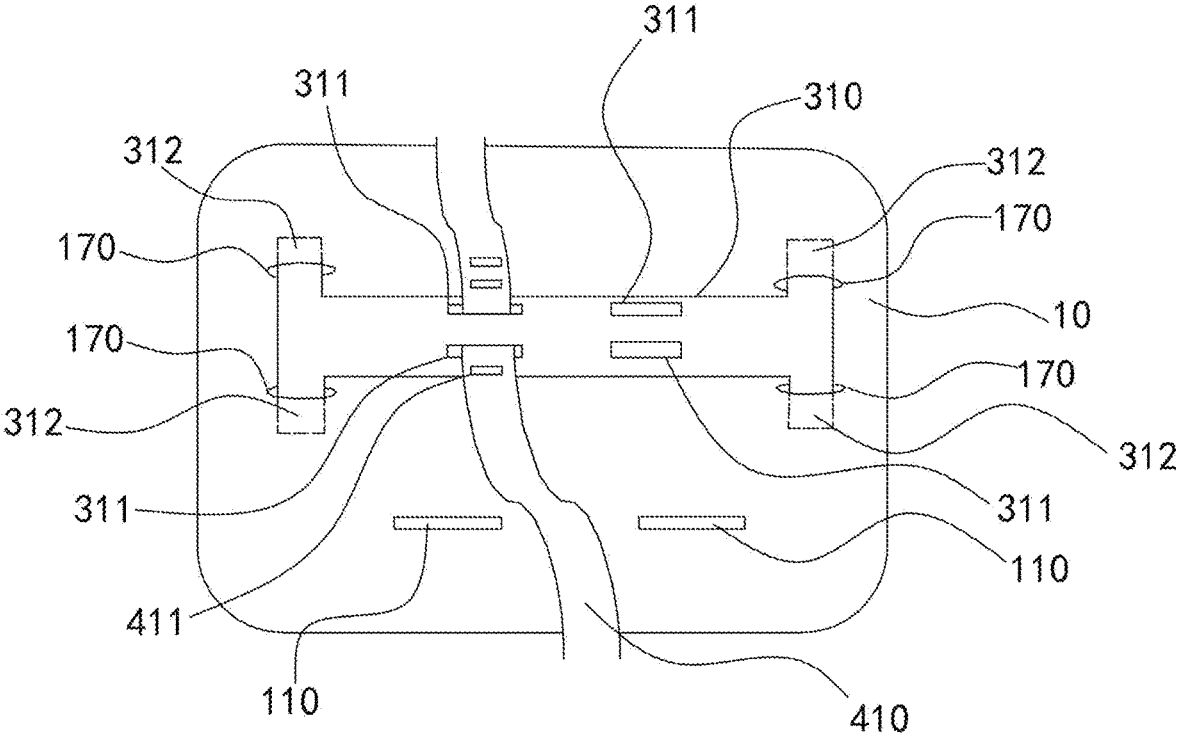
FIG. 12 is a rear schematic view of a headrest of an eighth embodiment of a child safety seat of the present disclosure.

Referring to FIG. 12, in the present embodiment, the adjustment sheet 310 may be integrally formed, but the present disclosure is not limited thereto. Two fixing arms 312 may be respectively extended from both ends of the adjustment sheet 310 in a direction perpendicular to the length thereof. The two fixing arms 312 extending from each end of the adjustment sheet 310 extend in opposite directions. In other words, each end of the adjustment sheet 310 may be formed in a T-shape. Connecting holes 170 may be formed on the headrest 10. The number and position of the connecting holes 170 may correspond to the number and position of the fixing arms 312. Since the adjustment sheet 310 may be bent, the fixing arms 312 may be respectively inserted into the corresponding connection holes 170, thereby fixing the position of the headrest 10 by the adjustment sheet 310. At the same time, the headrest 10 may be separated from the adjustment sheet 310 by bending the fixing arms 312.

Although only one adjustment belt 410 is shown in FIG. 12, there may be two adjustment belts 410 arranged side by side symmetrically in the present embodiment. A portion of the fixing arms 312 is shown as a dotted line in FIG. 12, indicating that the portion of the fixing arms 312 extends into the connection holes 170.

In this embodiment, the button may not be provided. Other parts of the embodiment may be referred to the seventh embodiment.

In the present embodiment, because of the cooperation of connection holes 170 and the fixing arms 312, the adjustment sheet 310 may form a stable and reliable connection with the headrest 10, while the adjustment sheet 310 may be separated from the headrest 10, and the headrest 10 may be prevented from shaking, so that the operation is convenient.

A ninth embodiment of the present disclosure will be described below. The ninth embodiment is similar to the seventh embodiment and only the difference parts will be described below.

Figure 13:
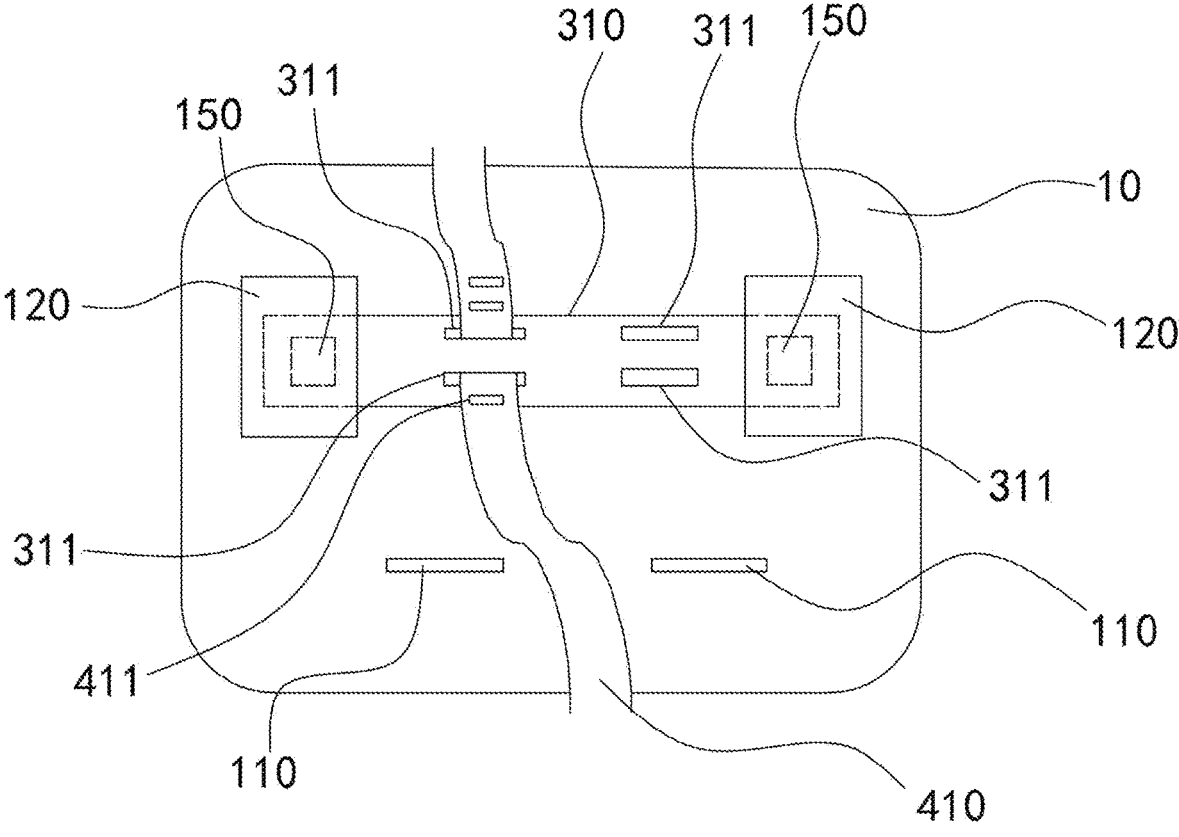
FIG. 13 is a rear schematic view of a headrest of a ninth embodiment of a child safety seat of the present disclosure.

Referring to FIG. 13, in the present embodiment, the adjustment sheet 310 may be integrally formed, but the present disclosure is not limited thereto. The adjustment sheet 310 may be formed as a rectangle (i.e., having a uniform width), but the present disclosure is not limited thereto. Both ends of the adjustment sheet 310 are detachably connected to the headrest 10 through the second attachment portion 150. The second attachment portion 150 may be a Hook & Loop fastener. Each end of the adjustment sheet 310 may be provided with one Hook & Loop fastener, but the number of Hook & Loop fastener is not limited in the application. Two portions of the second attachment portion (Hook & Loop fastener) 150 are provided at corresponding positions on the adjustment sheet 310 and the headrest 10, respectively.

The headrest 10 may include two pockets 120. The two pockets 120 may be provided at positions corresponding to both ends of the adjustment sheet 310, such that both ends of the adjustment sheet 310 may be inserted into the two pockets 120, respectively. Each of the pockets 120 is, for example, a sheet member covering the headrest 10, wherein a portion of the periphery of the sheet member (e.g., upper, lower, and left sides for the left pocket 120 in FIG. 13) is attached to the headrest 10, while the remaining portion of the periphery of the sheet member (e.g., a right side for the left pocket 120 in FIG. 13) is not attached to the headrest 10, so that an opening may be formed. To facilitate insertion of the adjustment sheet 310 into the pocket 120, the adjustment sheet may be foldable.

When both ends of the adjustment sheet 310 are inserted into the two pockets 120 respectively, the two second attachment portions 150 may be located in the two pockets 120, thereby ensuring that the adjustment sheet 310 is stably fixed to the headrest 10.

Although only one adjustment belt 410 is shown in FIG. 13, there may be two adjustment belts 410 arranged side by side symmetrically in the present embodiment. Both ends of the adjustment sheet 310 are shown as dotted lines in FIG. 13, indicating that both ends of the adjustment sheet 310 extend into the pocket 120. The second attachment portion 15 is shown as a dotted line in FIG. 13, indicating that the second attachment portion 150 is disposed on a side of the adjustment sheet 310 facing the headrest 10, so as to be blocked by the adjustment sheet 310 and the pocket 120.

In this embodiment, the button may not be provided. Other parts of the embodiment may be referred to the seventh embodiment.

In this embodiment, because of the fixing force of the Hook & Loop fastener and the restraint of the pockets 120 on the adjustment sheet 310, the adjustment sheet 310 may form a stable and reliable connection with the headrest 10, while the adjustment sheet 310 may be separated from the headrest 10, and the headrest 10 may be prevented from shaking, so that the operation is convenient.

A tenth embodiment of the present disclosure will be described below. The tenth embodiment is similar to the seventh embodiment and only the difference parts will be described below.

Figure 14:
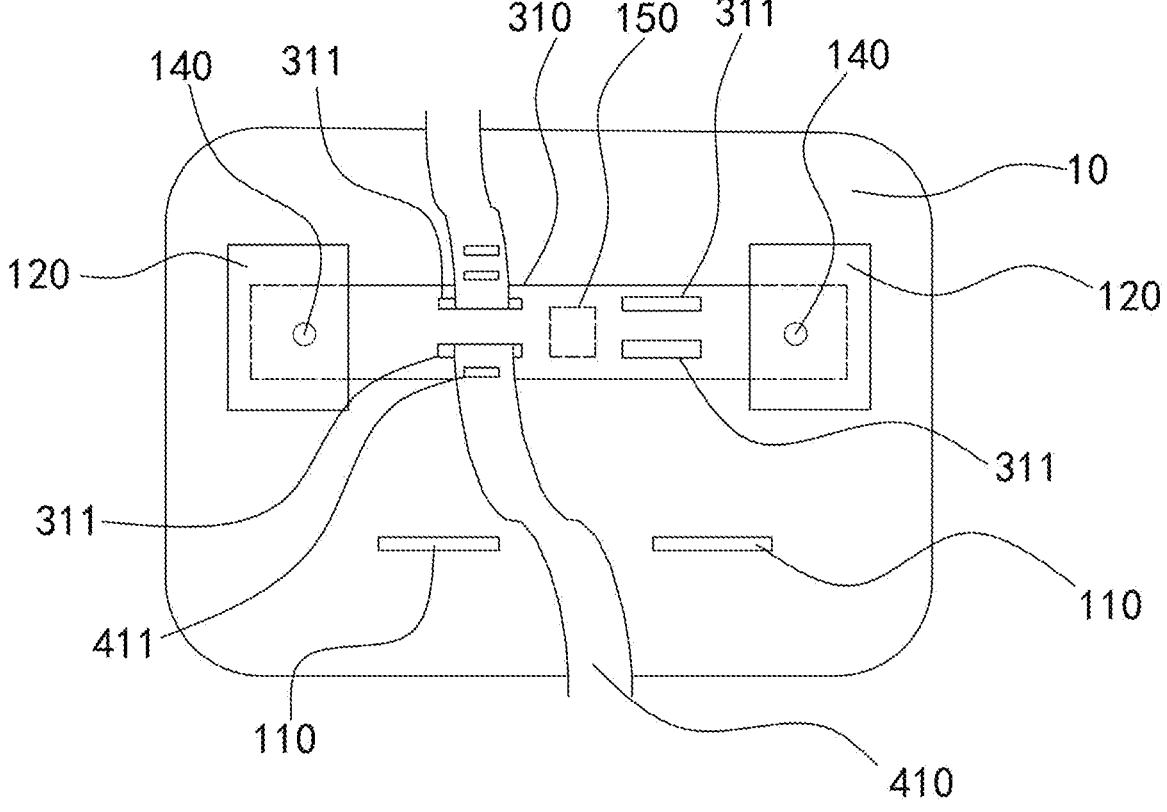
FIG. 14 is a rear schematic view of a headrest of a tenth embodiment of a child safety seat of the present disclosure.

Referring to FIG. 14, in the present embodiment, the adjustment sheet 310 may be integrally formed, but the present disclosure is not limited thereto. The adjustment sheet 310 may be formed as a rectangle (i.e., having a uniform width), but the present disclosure is not limited thereto. Both ends of the adjustment sheet 310 are detachably connected to the headrest 10 by the first attachment portion 140. The first attachment portion 140 may be a button. Each end of the adjustment sheet 310 may be provided with one button, but the present disclosure does not limit the number of the button. Two portions of the first attachment portion (button) 140 are provided at corresponding positions on the adjustment sheet 310 and the headrest 10, respectively.

The headrest 10 may include two pockets 120. The two pockets 120 may be provided at positions corresponding to both ends of the adjustment sheet 310, such that both ends of the adjustment sheet 310 may be inserted into the two pockets 120, respectively. Each of the pockets 120 is, for example, a sheet member covering the headrest 10, wherein a portion of the periphery of the sheet member (e.g., upper, lower, and left sides for the left pocket 120 in FIG. 13) is attached to the headrest 10, while the remaining portion of the periphery of the sheet member (e.g., a right side for the left pocket 120 in FIG. 13) is not attached to the headrest 10, so that an opening may be formed. To facilitate insertion of the adjustment sheet 310 into the pocket 120, the adjustment sheet may be foldable.

When both ends of the adjustment sheet 310 are inserted into the two pockets 120 respectively, the two first attachment portions 140 may be located in the two pockets 120, thereby ensuring that the adjustment sheet 310 is stably fixed to the headrest 10.

One second attachment portion 150 may also be provided in a middle portion of the adjustment sheet 310, but the number of the second attachment portion 150 is not limited in the present disclosure. The second attachment portion 150 may be the Hook & Loop fastener.

Although only one adjustment belt 410 is shown in FIG. 14, there may be two adjustment belts 410 arranged side by side symmetrically in the present embodiment. Both ends of the adjustment sheet 310 are shown as dotted lines in FIG. 13, indicating that both ends of the adjustment sheet 310 extend into the pocket 120. The first attachment portion 140 is shown as a dotted line in FIG. 13, indicating that the first attachment portion 140 is disposed on the side of the adjustment sheet 310 facing the headrest 10, so as to be blocked by the adjustment sheet 310 and the pocket 120. The second attachment portion 150 is shown as a dotted line in FIG. 13, indicating that the second attachment portion 150 is disposed on the side of the adjustment sheet 310 facing the headrest 10, so as to be blocked by the adjustment sheet 310.

Other parts of this embodiment may be referred to the seventh embodiment.

In this embodiment, because of the fixing force of the Hook & Loop fastener and buttons and the restraint of the pockets 120 on the adjustment sheet 310, the adjustment sheet 310 may form a stable and reliable connection with the headrest 10, while the adjustment sheet 310 may be separated from the headrest 10, and the headrest 10 may be prevented from shaking.

The height of the headrest of the child safety seat of the present disclosure may be adjusted, while the height of the shoulder belt may be synchronously adjusted. For example, the headrest is provided with the shoulder belt hole. When the height of the headrest is adjusted, the shoulder belt is drived and the height of the shoulder belt is adjusted synchronously. In addition, the headrest of the child safety seat according to the present disclosure may be detached from the child safety seat to facilitate operations including maintenance, replacement, or the like.

Other embodiments of the present disclosure will readily occur to those skilled in the art after considering the specification and practicing the present disclosure disclosed herein. The present disclosure is intended to cover any variations, uses, or adaptations of the present disclosure that follow the general principles of the present disclosure and include the common knowledge or conventional technical means in the art that are not disclosed in the present disclosure. The specification and embodiments are to be considered exemplary only and the true scope and spirit of the present disclosure are indicated by the claims of the present disclosure.

Although the present disclosure has been described with reference to typical embodiments, the terms used are illustrative and exemplary and are not limiting. Since the present disclosure can be embodied in various forms without departing from the spirit and essence of the present disclosure, it is therefore to be understood that the foregoing embodiments are not limited to any of the foregoing details, but are to be construed as broadly as defined by the claims, so that all variations falling within the scope of the claims or their equivalents are to be covered by the claims.

What is claimed is:

1. A child safety seat, comprising:
   a backrest;
   a headrest formed with a shoulder belt hole; and
   a shoulder belt extending through the shoulder belt hole,
      wherein a back surface of the headrest has a first connector and a front surface of the backrest has a second connector, and the first connector is attached to the second connector in a height adjustable manner, and
      wherein the first connector is an adjustment sheet, the adjustment sheet is formed with a plurality of adjustment holes penetrating therethrough, the second connector is an adjustment belt.

2. The child safety seat according to claim 1, wherein one end of the adjustment belt is fixed to the backrest and the other end of the adjustment belt is fixedly or detachably connected to the backrest, and the adjustment belt is penetrated between the adjustment sheet and the headrest from one of the adjustment holes and penetrated out of the adjustment sheet from another of the adjustment holes, so that the adjustment sheet and/or the adjustment holes exert a retaining force on the adjustment belt.

3. The child safety seat according to claim 2, wherein the second connector comprises two adjustment belts, and both ends of each of the two adjustment belts are located at different heights.

4. The child safety seat according to claim 2, wherein the adjustment belt is formed with a plurality of holes along a length direction thereof.

5. The child safety seat according to claim 2, wherein all peripheral edges of the adjustment sheet are fixed to the headrest.

6. The child safety seat according to claim 2, wherein only one side of peripheral edges of the adjustment sheet is fixed to the headrest.

7. The child safety seat according to claim 2, wherein the headrest has two adjustment sheets, the two adjustment sheets are arranged side by side, and only one side of each of the two adjustment sheets close to each other is fixed to the headrest.

8. The child safety seat according to claim 2, wherein the headrest comprises a pocket, and a portion of the adjustment sheet is inserted into the pocket.

9. The child safety seat according to claim 8, wherein the headrest comprises a fixing belt, an end of the fixing belt is fixed to the headrest, and the other end of the fixing belt is detachably connected to a first surface of the adjustment sheet.

10. The child safety seat according to claim 9, wherein the headrest is detachably connected to a second surface of the adjustment sheet, and the first surface is opposite to the second surface.

11. The child safety seat according to claim 9, wherein the end of the fixing belt is located within the pocket.

\* \* \* \* \*